United States Patent
Steiner

(12) 
(10) Patent No.: US 8,636,183 B1
(45) Date of Patent: Jan. 28, 2014

(54) CELL PHONE CASE WITH INTEGRAL RESILIENT SUSPENSION HOOK

(76) Inventor: Russell C. Steiner, Santa Barbara, CA (US)

(*) Notice: Subject to any disclaimer, the term of this patent is extended or adjusted under 35 U.S.C. 154(b) by 0 days.

(21) Appl. No.: 13/601,557

(22) Filed: Aug. 31, 2012

(51) Int. Cl.
   *B60R 7/06* (2006.01)
   *B60R 11/02* (2006.01)

(52) U.S. Cl.
   USPC ............ 224/483; 224/556; 224/560; 224/929

(58) Field of Classification Search
   USPC ......... 224/269, 929, 930, 556, 544, 483, 242;
                  D14/250, 251, 253; 361/679.59
   See application file for complete search history.

(56) References Cited

U.S. PATENT DOCUMENTS

| | | | | |
|---|---|---|---|---|
| 3,033,362 | A | * | 5/1962 | Marcalus ...................... 206/494 |
| 4,883,175 | A | * | 11/1989 | Thiele et al. .................. 206/393 |
| 5,971,242 | A | * | 10/1999 | Schuerman .................... 224/544 |
| 5,995,622 | A | * | 11/1999 | Roussy et al. ................. 379/446 |
| 6,029,871 | A | * | 2/2000 | Park .............................. 224/197 |
| 6,441,872 | B1 | * | 8/2002 | Ho ................................. 348/837 |
| 6,888,940 | B1 | | 5/2005 | Deppen |
| 7,367,089 | B2 | | 5/2008 | Cooke et al. |
| 7,597,225 | B2 | | 10/2009 | Badillo et al. |
| 7,722,388 | B1 | | 5/2010 | Michaeli et al. |
| 7,766,294 | B2 | | 8/2010 | Schimmeyer |
| 7,857,178 | B2 | | 12/2010 | Brown, Jr. |
| D647,085 | S | * | 10/2011 | Chung et al. ................. D14/250 |
| 8,047,499 | B2 | * | 11/2011 | Yu et al. ......................... 248/688 |
| 8,096,517 | B1 | * | 1/2012 | Hamilton ..................... 248/308 |
| D663,294 | S | * | 7/2012 | Buxton ....................... D14/250 |
| 8,262,053 | B1 | * | 9/2012 | Zhao ........................... 248/676 |
| 8,359,078 | B2 | * | 1/2013 | Hung ........................ 455/575.8 |
| 2005/0255898 | A1 | | 11/2005 | Huang |
| 2008/0119244 | A1 | | 5/2008 | Malhotra |
| 2009/0026242 | A1 | | 1/2009 | Kim |
| 2010/0072334 | A1 | | 3/2010 | Le Gette et al. |
| 2010/0200628 | A1 | | 8/2010 | Tages |
| 2010/0267431 | A1 | * | 10/2010 | Fratti et al. ................. 455/575.6 |
| 2011/0108632 | A1 | | 5/2011 | Brandenburg et al. |
| 2011/0297714 | A1 | | 12/2011 | Freeman |

OTHER PUBLICATIONS

Car Air Vent Mount Nolder Cradle, identified at http://www.amazon.com/gp/;product/B00500G170.
Car Air Vent Phone HOlder Mount for iPhone(r) 3G, identified at http://www.amazon.com/Vent-Phone-Holder-Mount-IPhone%C3%AE/dp/BOC5YW2CPO/ref=pd_cp_cps_2.

* cited by examiner

Primary Examiner — Justin Larson
(74) Attorney, Agent, or Firm — Felix L. Fischer

(57) ABSTRACT

A protective cover for a personal electronic device incorporates a case received over the personal electronic device and providing viewing of a screen on the personal electronic device. At least one suspension flap has a first position extending over an upper edge of the personal electronic device substantially flush with the case and a second position released from the upper edge and rotated rearward. The flap includes an angled element to engage a vent slat to suspend the personal electronic device.

11 Claims, 23 Drawing Sheets

CELL PHONE CASE WITH INTEGRAL RESILIENT SUSPENSION HOOK

BACKGROUND

1. Field

This invention relates generally to the field of cases for cell phones, smart phones, electronic tablets and other personal electronic devices and more particularly to a case having an integral structure for hanging the case from a slatted vent such as an automobile air conditioning vent.

2. Description of the Related Art

Cellular phones, smart phones, personal digital assistants, electronic tablets and other personal electronic devices are becoming highly sophisticated and employ numerous supplemental systems such as Global Positioning Systems (GPS) and mapping as well as other functional applications or "apps". These devices are being used with greater frequency in automobiles or other locations where hands free operation is desired or required. Mechanical frames or holders have been created to support personal electronic devices from vehicle mirrors, dashboards or instrument panel. However, such devices tend to be complex and bulky. Most users employ a hard or soft shell protective cover or case for general protection of the phone or other electronic device.

It is therefore desirable to provide a personal electronic device protective cover with integral provisions for support from a vehicle dashboard which is simple and sleek.

SUMMARY

The embodiments disclosed herein overcome the shortcomings of the prior art by providing a protective cover for a personal electronic device that incorporates a case received over the personal electronic device and provides viewing of a screen on the personal electronic device. At least one suspension flap has a first position extending over an upper edge of the personal electronic device substantially flush with the case and a second position released from the upper edge and rotated rearward. The flap includes an angled element to engage a vent slat to suspend the personal electronic device.

BRIEF DESCRIPTION OF THE DRAWINGS

These and other features and advantages of the present invention will be better understood by reference to the following detailed description of exemplary embodiments when considered in connection with the accompanying drawings wherein.

DETAILED DESCRIPTION

Figure 1A:
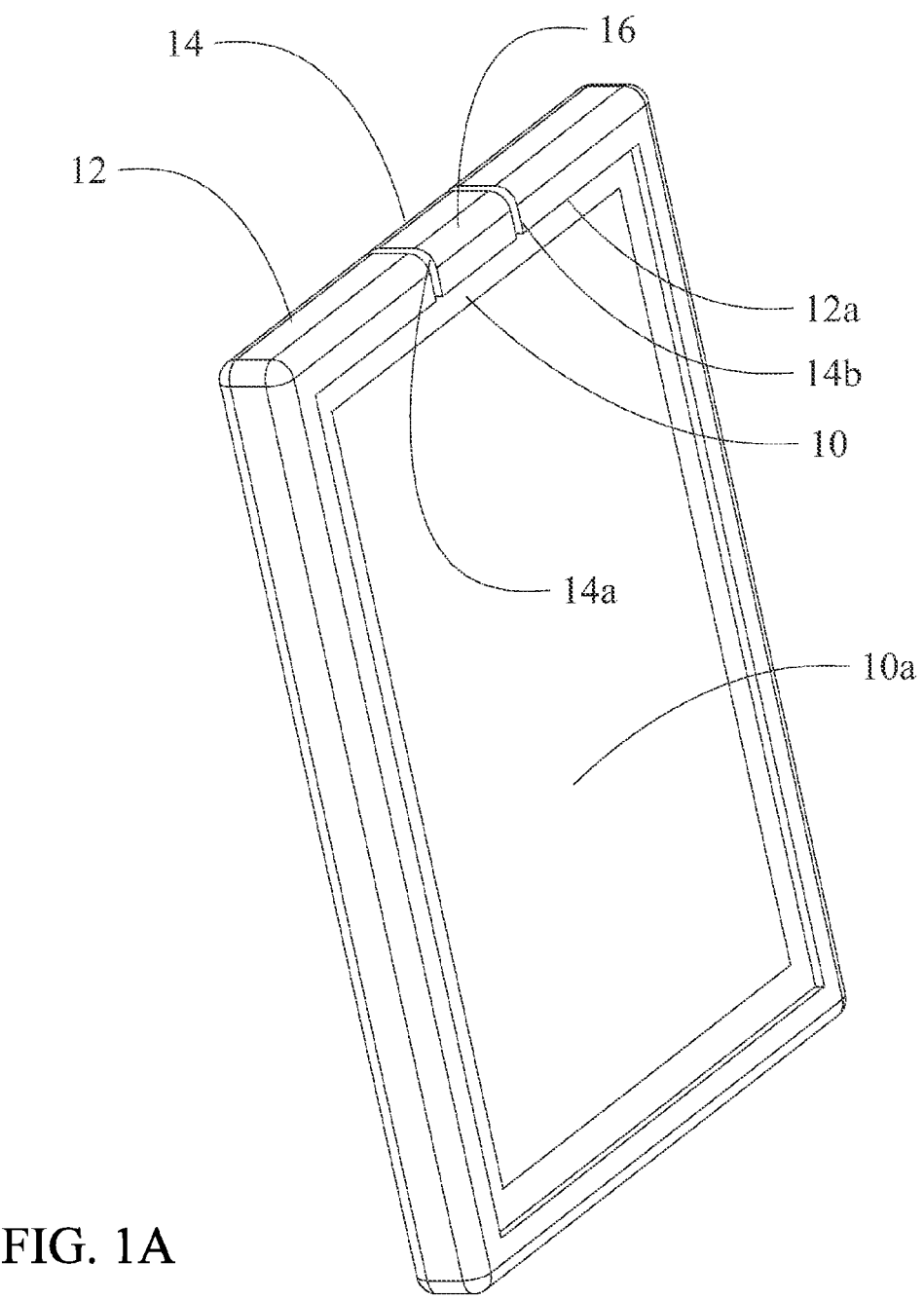
FIGS. 1A and 1B are front pictorial and rear pictorial views of a first embodiment for a case as installed on a cell phone or smart phone such as an i-Phone® by Apple, Droid® by Motorola, or other device having a similar planform and dimensions.
Figure 1B:
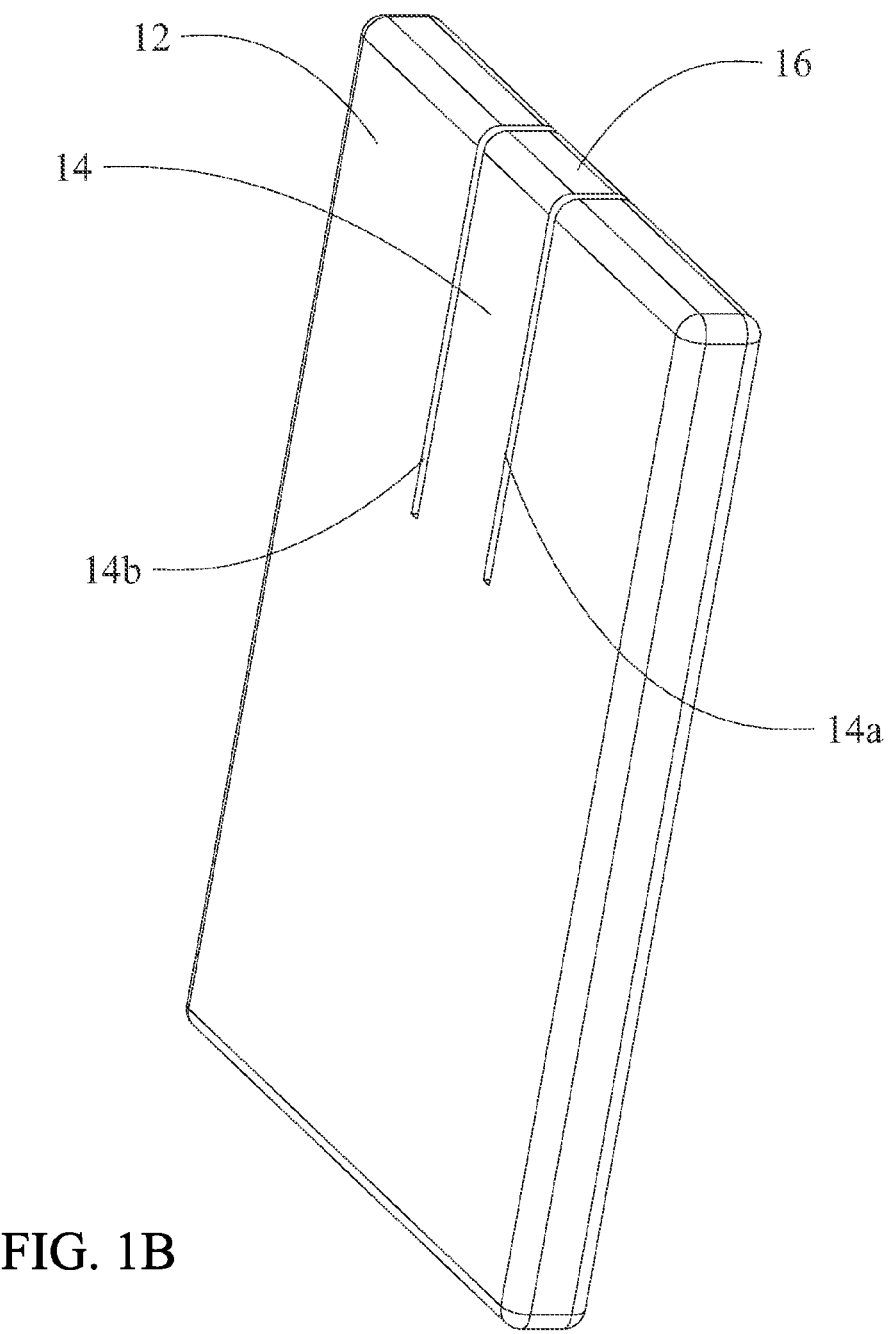

Embodiments shown in the drawings and described herein provide a self-hanging protective cover for cell phones, smart phones, electronic tablets, personal digital assistants (PDA) or other personal electronic devices which employs a case including a displacing flap for engaging the slats of an air conditioning vent in an automobile or similar device for hanging the in a convenient manner for hands free use. Referring to the drawings, FIG. 1A shows a cell phone 10, which is a generalized example but may be a cell phone, smart phone or PDA with a case 12 molded from resilient silicone rubber or other resilient elastomeric material. The case has a front cutout 12a which allows the screen 10a and controls of the cell phone to be exposed. A suspension flap 14 is created by providing two slots 14a and 14b in the case 12 from the upper edge into the back of the case opposite the front cutout as best seen in FIG. 1B.

Figure 2A:
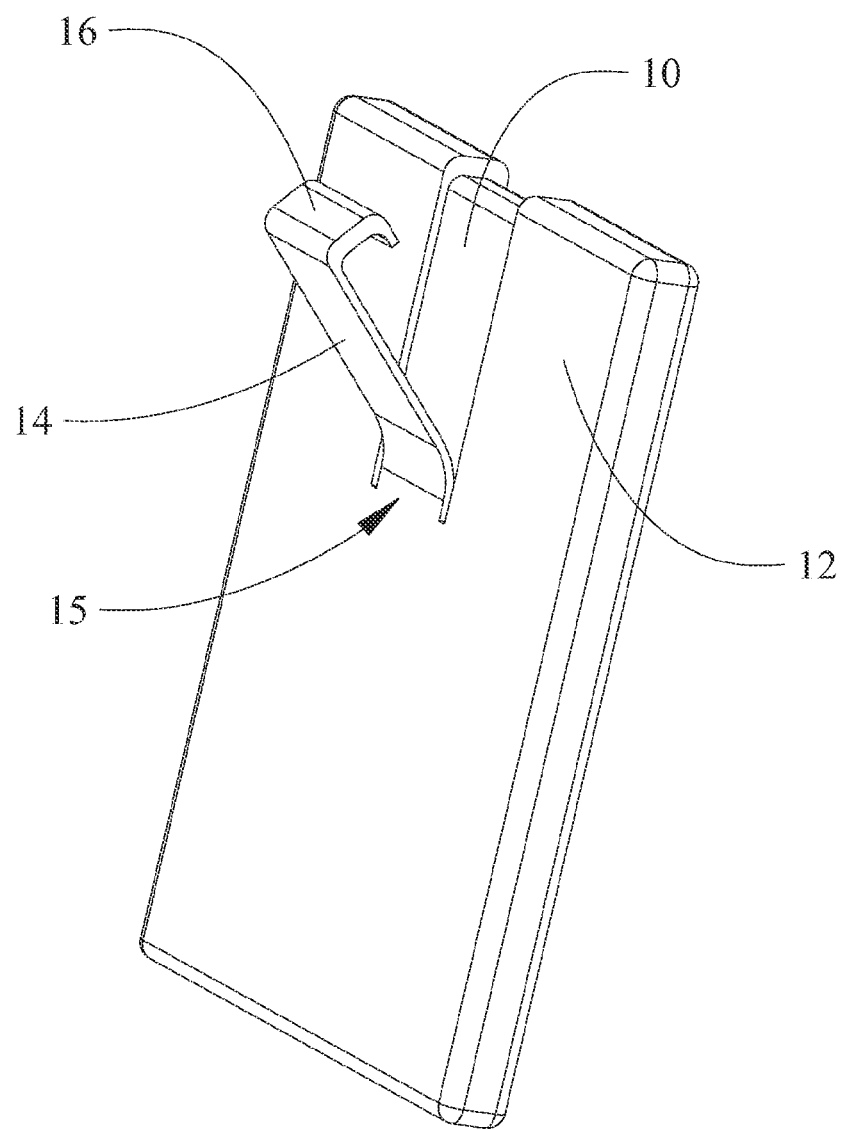
FIG. 2A is a rear pictorial view of the case of FIGS. 1A and 1B with the suspension flap resiliently displaced rearward from the case body and cell phone.
Figure 2B:
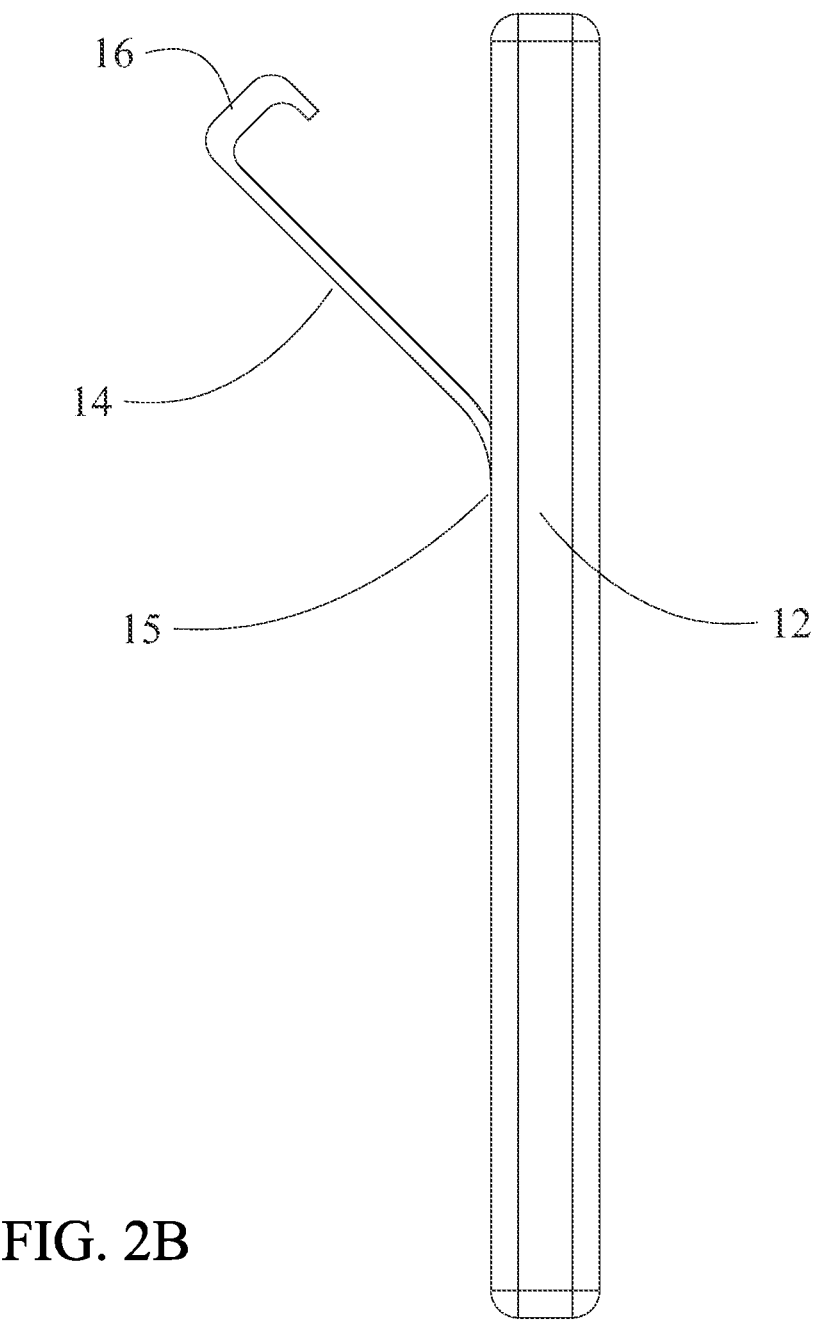
FIG. 2B is a side view of the case as shown in FIG. 2A.
Figure 2C:
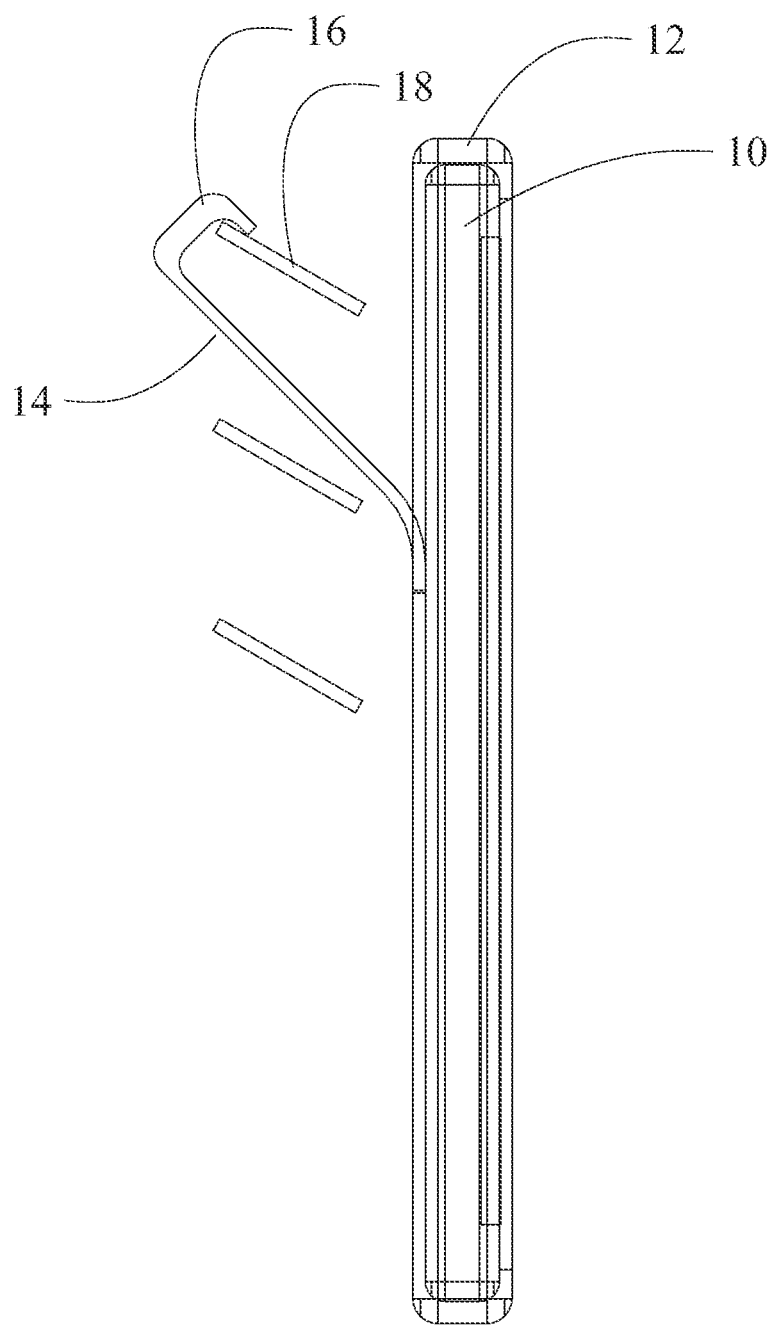
FIG. 2C is a side view of the case shown with the suspension flap inserted into the slats of an air conditioning vent and secured to one slat.
Figure 2D:
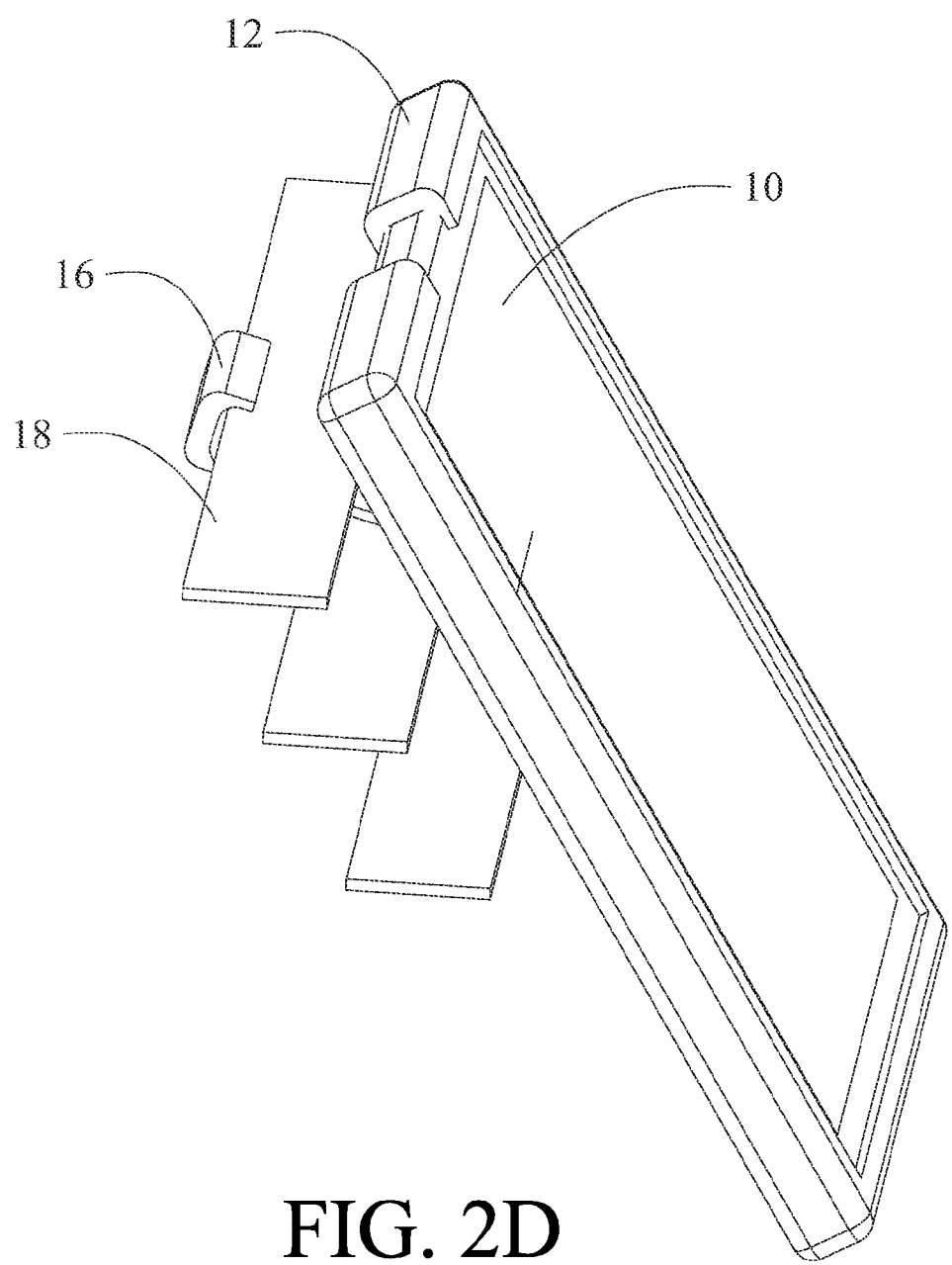
FIG. 2D is a pictorial view of the phone suspended by the suspension flap from the air conditioning vent.

As shown in FIGS. 2A and 2B, the suspension flap 14 may be disengaged from a first or closed position on the periphery of the cell phone 10 and resiliently bent away from the back of the phone to a second or open position with a "living hinge" in the area generally designated with element 15 created by the material in the cell phone case intermediate the termination of the slots 14a and 14b. An angled element or hook 16 comprising that portion of the suspension flap 14 that extends over the top periphery of the cell phone is sufficiently resilient to be released to disengage from the phone top but sufficiently rigid to suspend the weight of the phone and remain engaged to the phone top when closed. As shown in FIG. 2C, the suspension flap 14 when opened may then be inserted between the slats 18 of a conventional air conditioning vent in an automobile and hook 16 engaged on the rear edge of one of the slats. The phone and case may then be suspended from the vent in a substantially vertical position for easy hands free viewing. FIG. 2D shows a pictorial view.

The resiliently flexible nature of the hook and suspension flap allows easy removal of the suspended phone from the vent. To release, the device is lifted up slightly and the suspension flap is pushed down slightly with a finger which will lower the hook from the vent. The case may then be pulled forward gently and removed from the vent. The suspension flap 14 and hook 16 may then be re-engaged over the phone top.

Figure 3A:
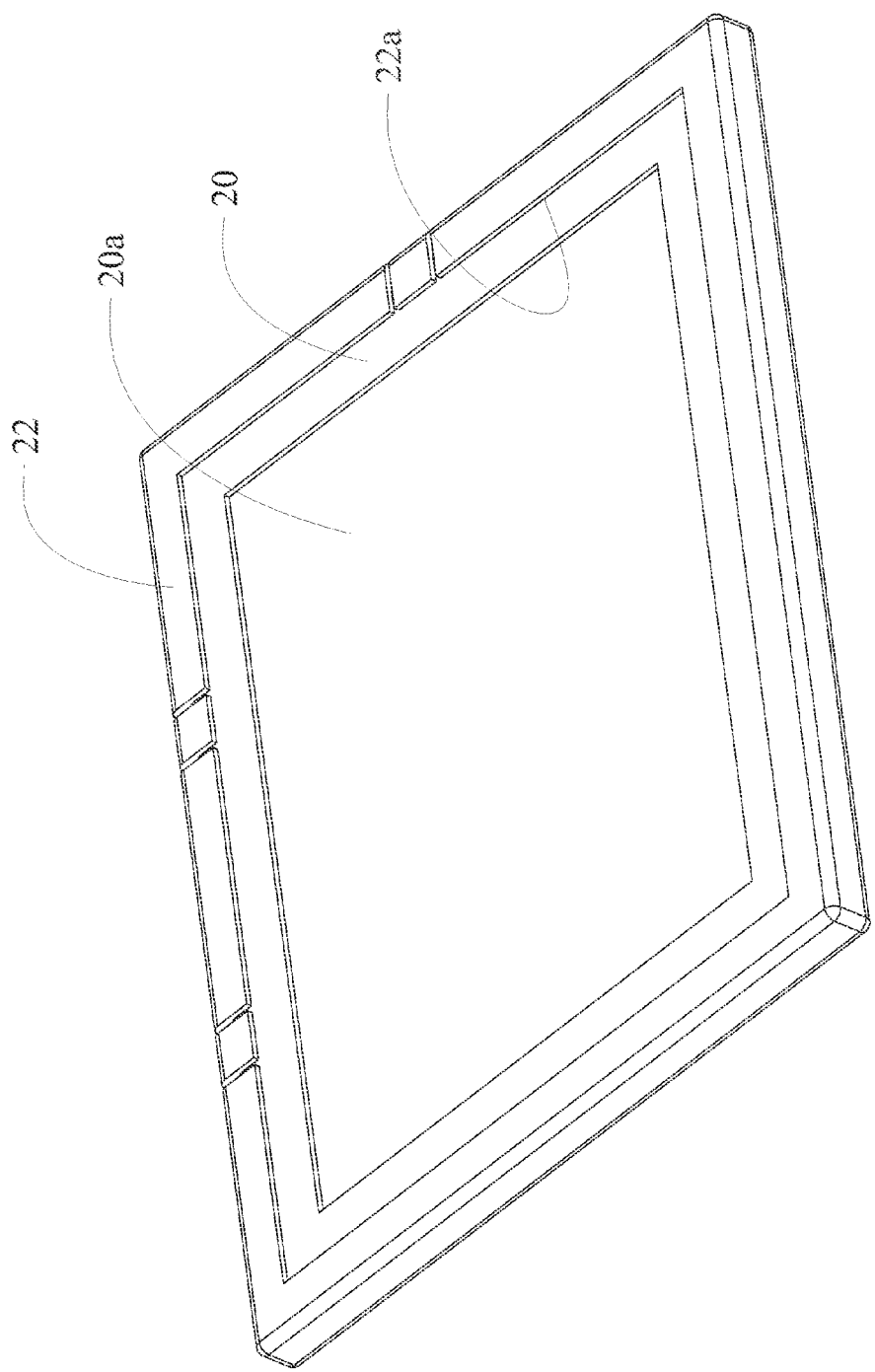
FIGS. 3A and 3B are a front pictorial and rear pictorial views of a second embodiment for case as installed on a personal electronic device such as an iPad® or Galaxy Tab® electronic tablet or similar device having comparable planform and dimensions and having two suspension flaps for greater lateral stability.
Figure 3B:
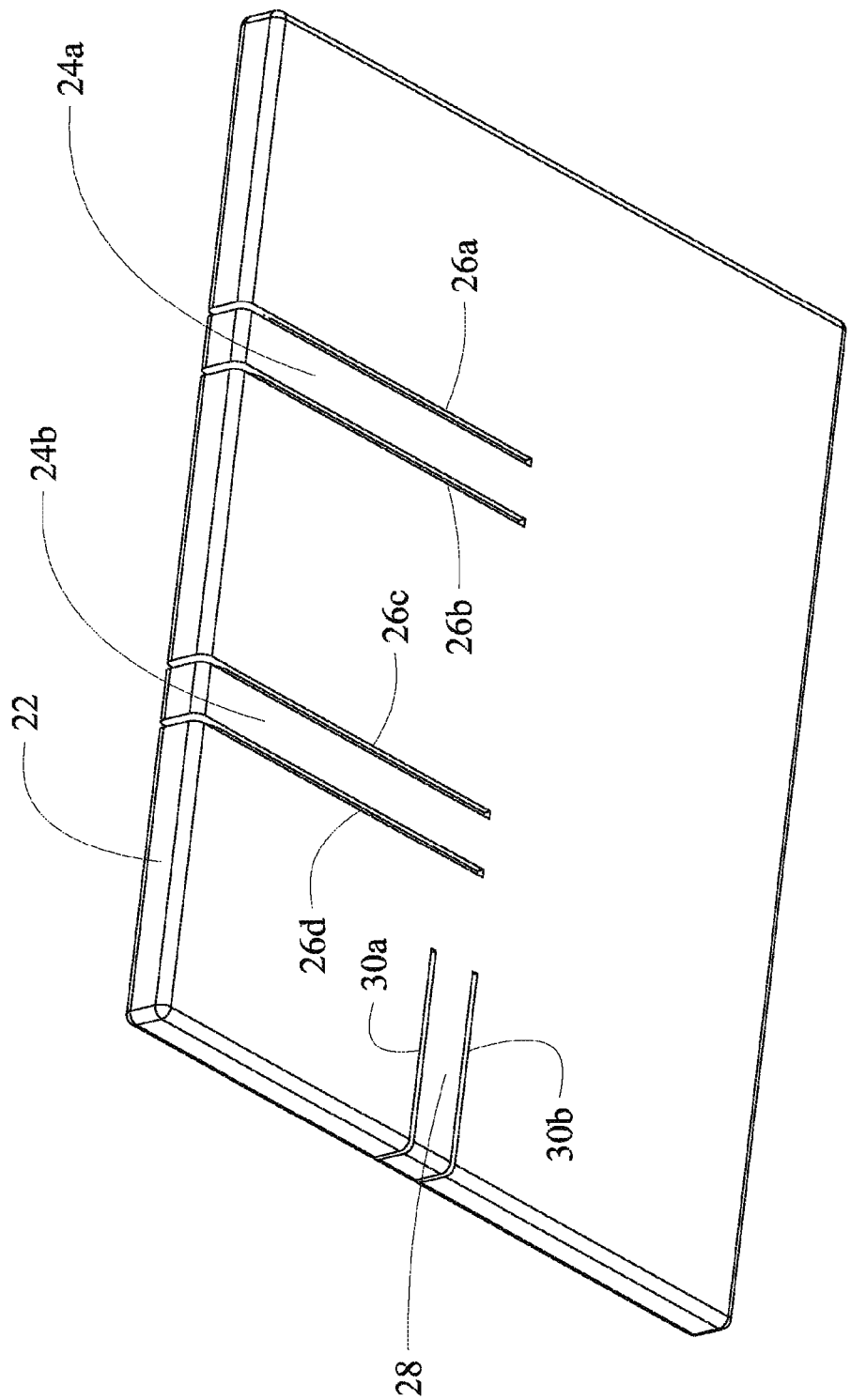

A second embodiment for the protective cover applicable for use with larger personal electronic devices such as electronic tablets like the Apple® iPad® is shown in FIGS. 3A and 3B. As with the first embodiment, the tablet 20 is closely held by a case 22 which is molded from resilient silicone rubber or other resilient elastomeric material. The case has a front cutout 22a which allows the screen 20a and controls of the tablet to be exposed. For suspending the case 22 with the tablet 20 in a "landscape" orientation, two suspension flaps 24a and 24b are created by providing slots 26a, 26b, 26c and 26d in the case 22 from the upper edge into the back of the case opposite the front cutout as best seen in FIG. 3B. For suspending the case in the "portrait" orientation, a single suspension flap 28 is created by providing slots 30a and 30b in the case 22 from one side edge into the back of the case opposite the front cutout.

Figure 4A:
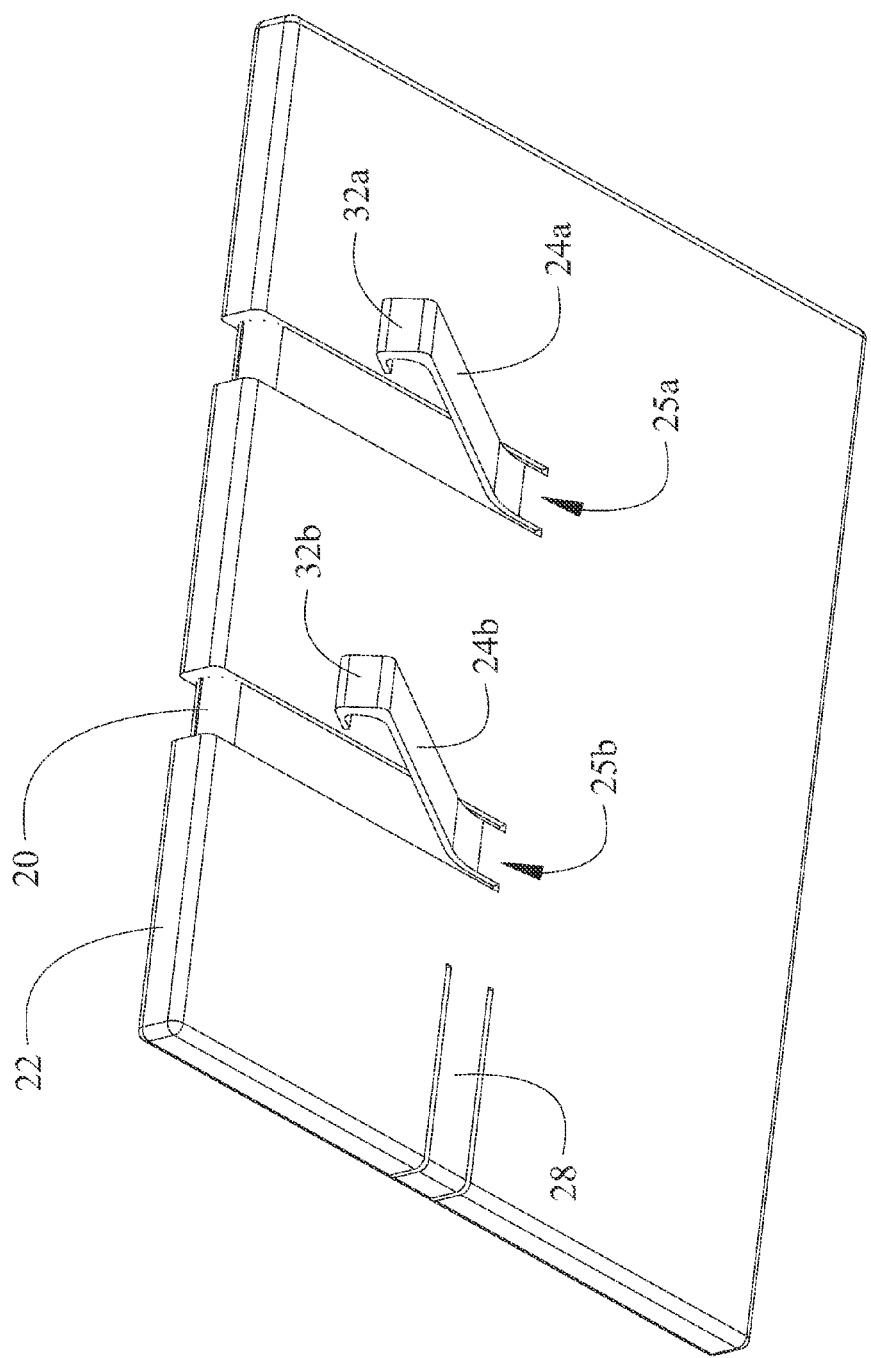
FIG. 4A is a rear pictorial view of the case of FIGS. 3A and 3B with the suspension flaps resiliently displaced rearward from the case body and cell phone.
Figure 4B:
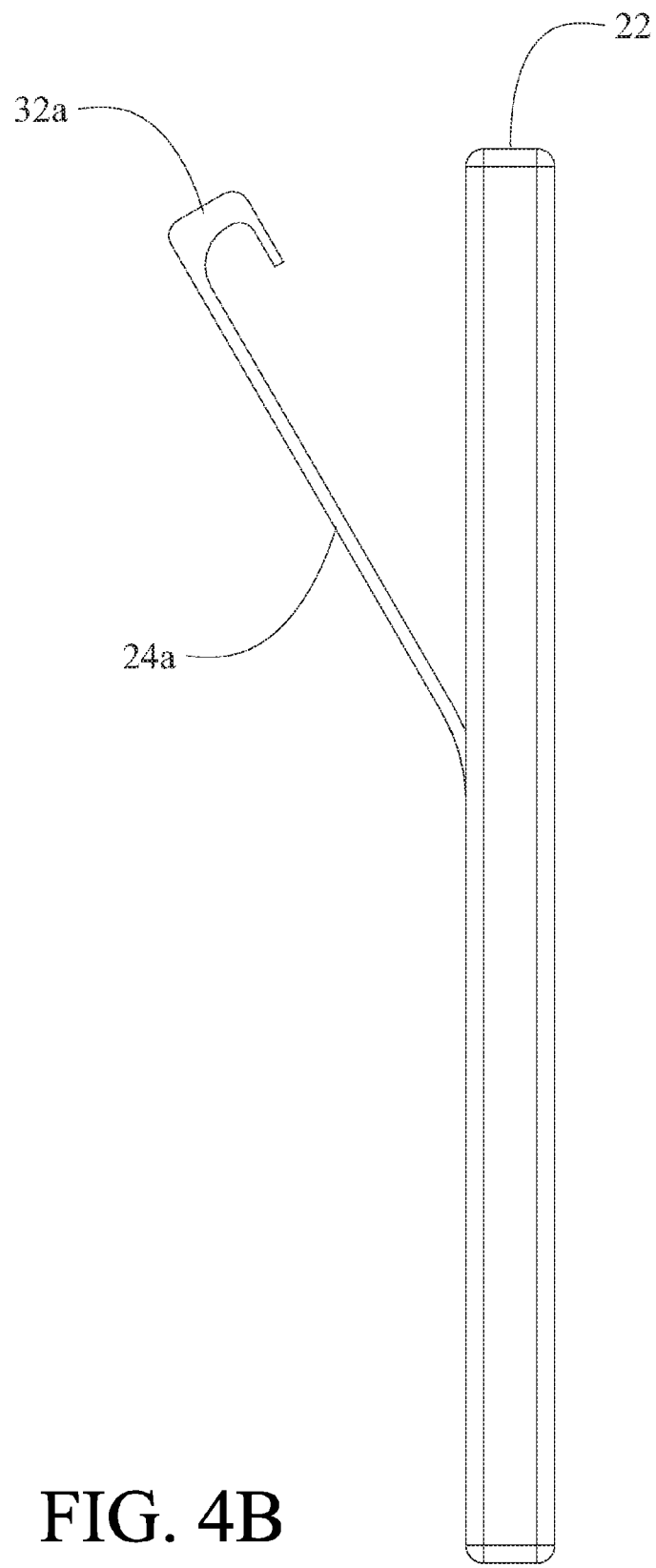
FIG. 4B is a side view of the case as shown in FIG. 4A.
Figure 4C:
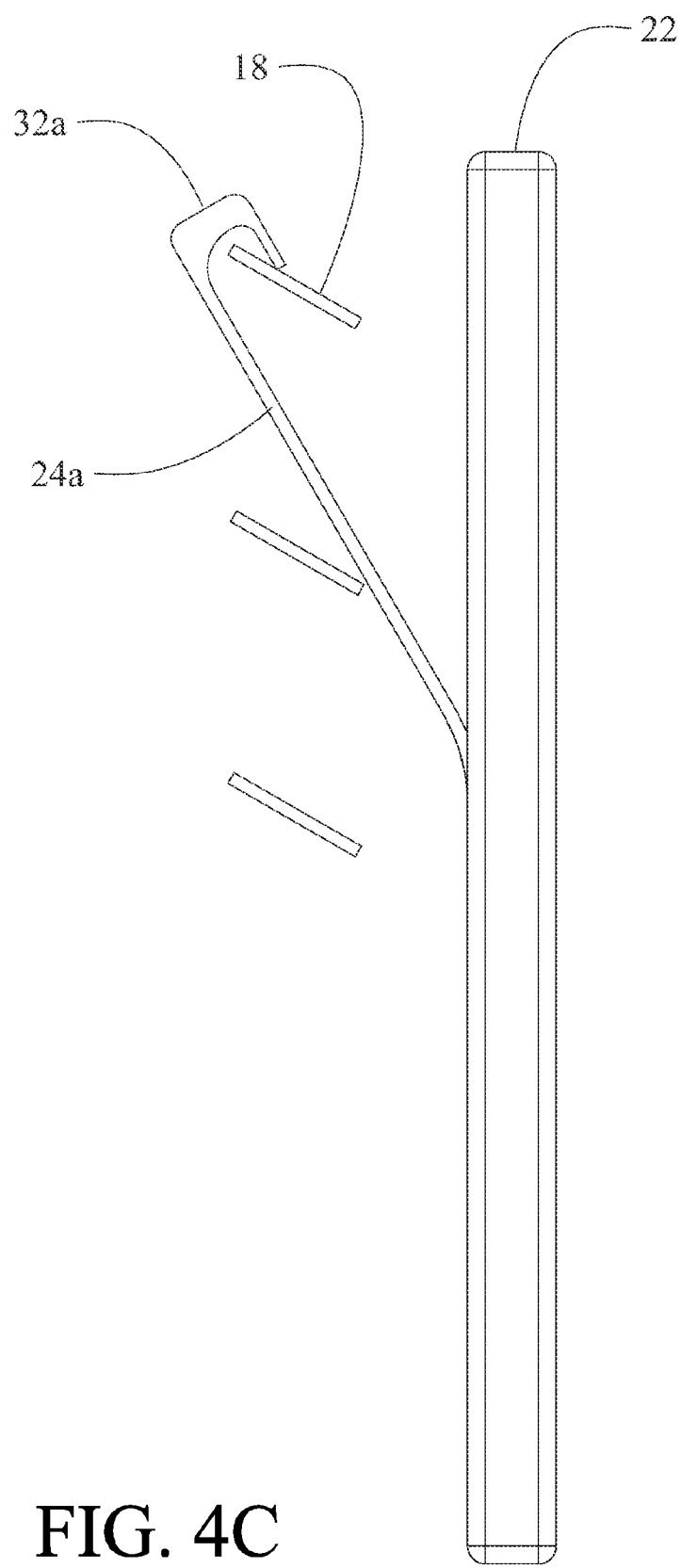
FIG. 4C is a side view of the case shown with the suspension flaps inserted into the slats of an air conditioning vent and secured to one slat.
Figure 4D:
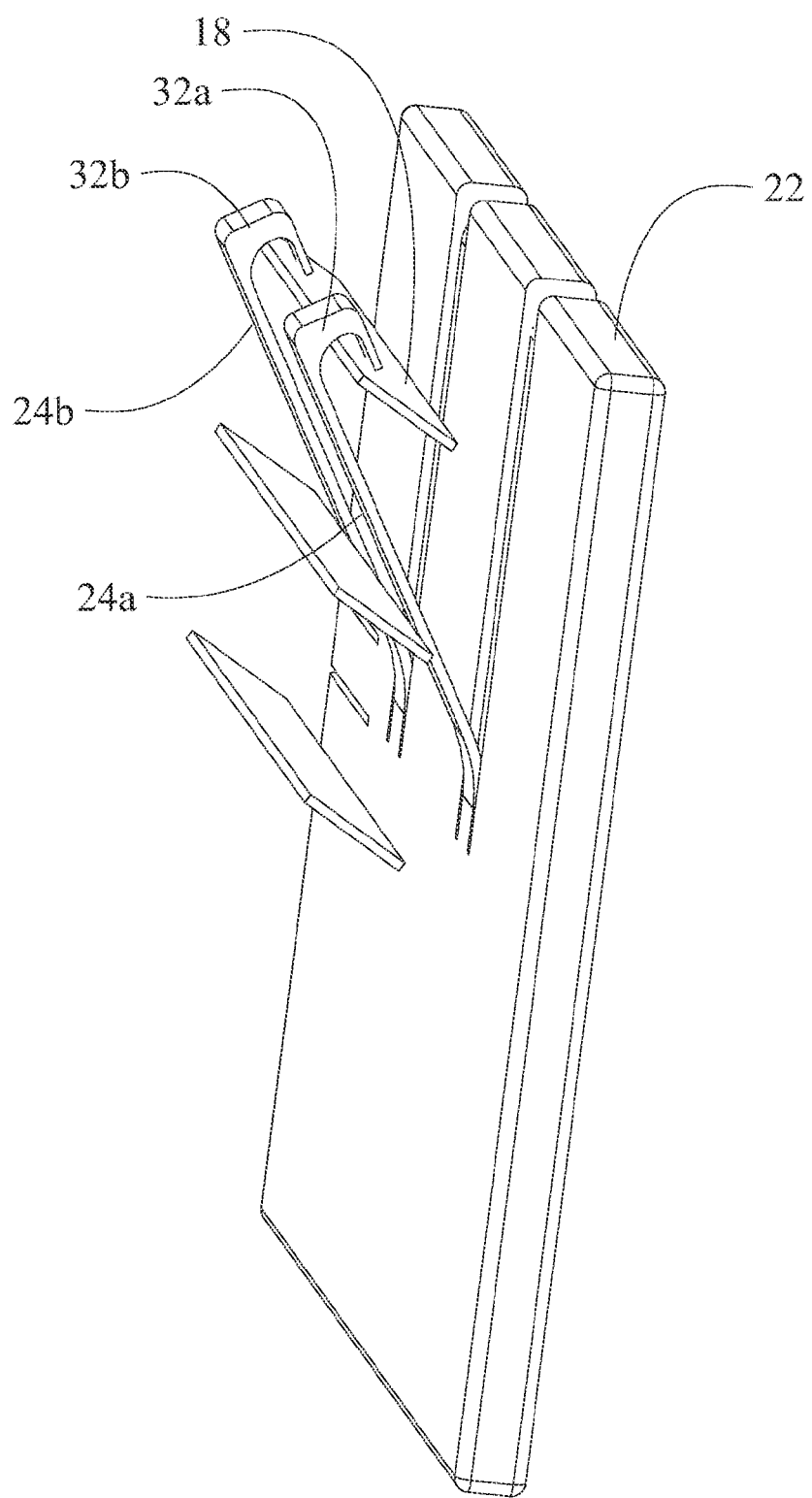
FIG. 4D is a pictorial view of the tablet suspended by the suspension flaps from the air conditioning vent.

As shown in FIGS. 4A and 4B for the landscape orientation, the suspension flaps 24a and 24b may be disengaged from the periphery of the table 20 and resiliently bent away from the back of the phone with living hinges in the areas generally designated with elements 25a and 25b created by the material in the case. The angled elements or hooks 32a and 32b comprising that portion of the suspension flaps 24a and 24b that extend over the top periphery of the tablet are sufficiently resilient to be disengaged from the tablet top but sufficiently rigid to suspend the weight of the tablet and remain engaged to the phone top when closed. As shown in FIG. 4C, the suspension flaps 22a and 22b may then be inserted between the slats 18 of a conventional air conditioning vent in an automobile and hooks 32a and 32b engaged on the rear edge of one of the slats. The tablet and case may then be suspended from the vent in a substantially vertical position for easy hands free viewing. FIG. 4D shows a pictorial view.

Figure 5A:
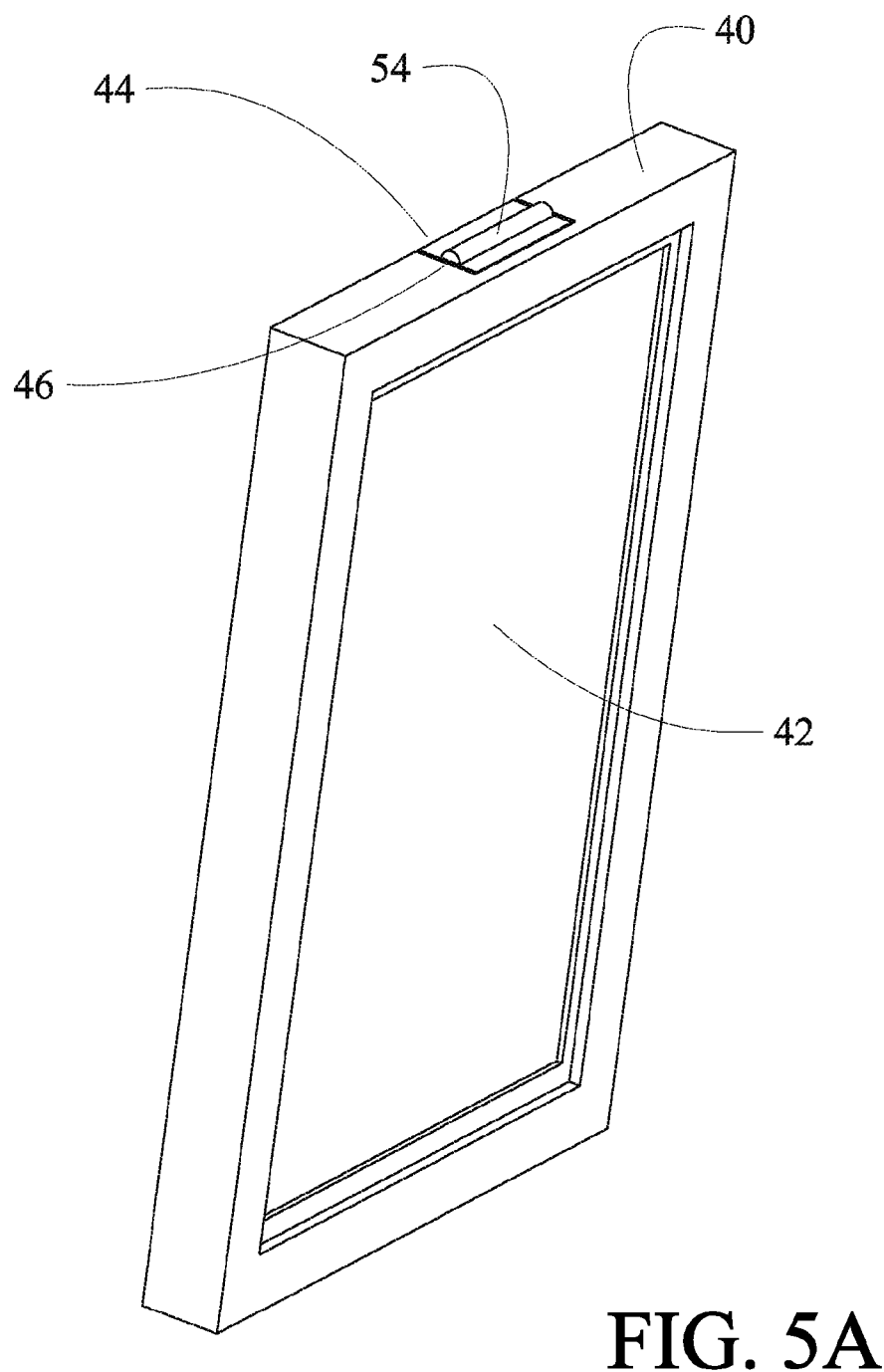
FIGS. 5A and 5B are front pictorial and rear pictorial views of a third embodiment for a case as installed on a cell phone or smart phone.
Figure 5B:
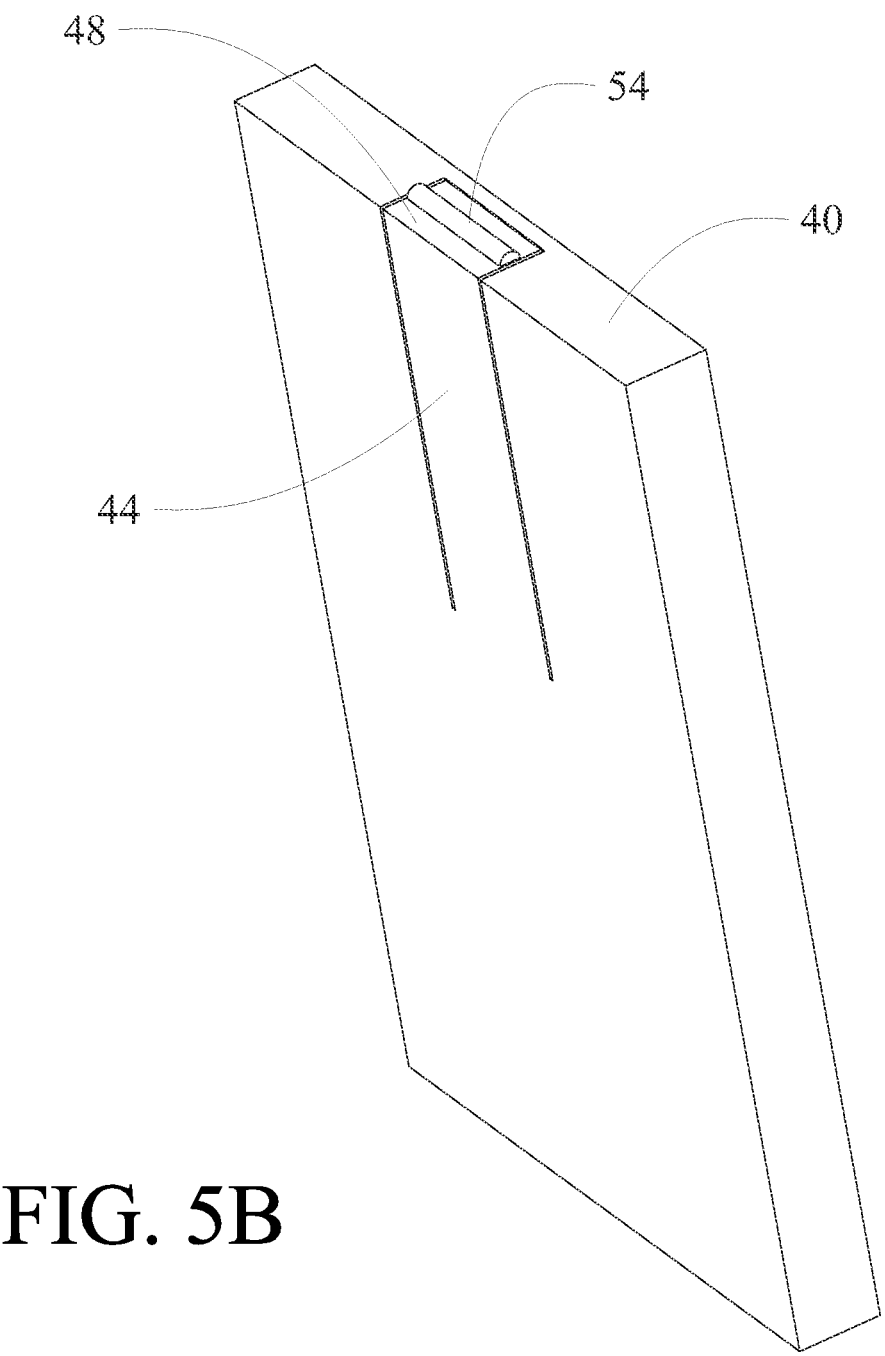
Figure 6A:
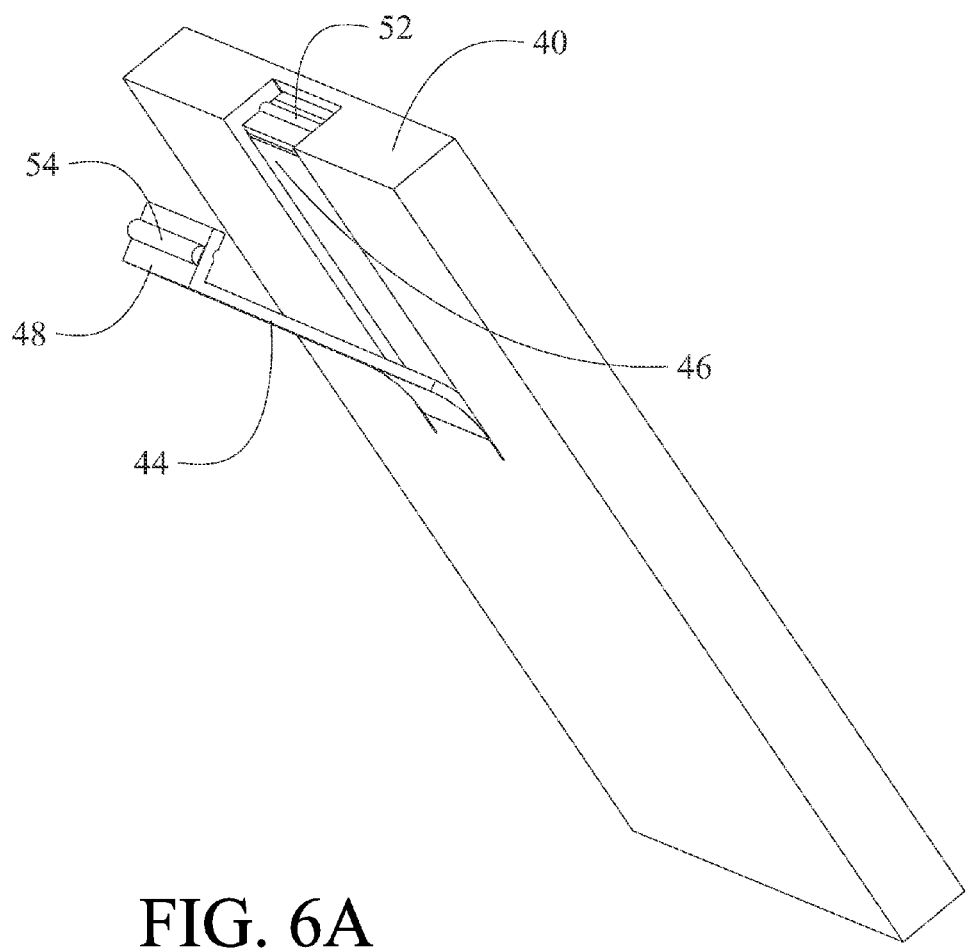
FIG. 6A is a rear pictorial view of the case of FIGS. 1A and 1B with the suspension flap resiliently displaced rearward from the case body and cell phone.
Figure 6B:
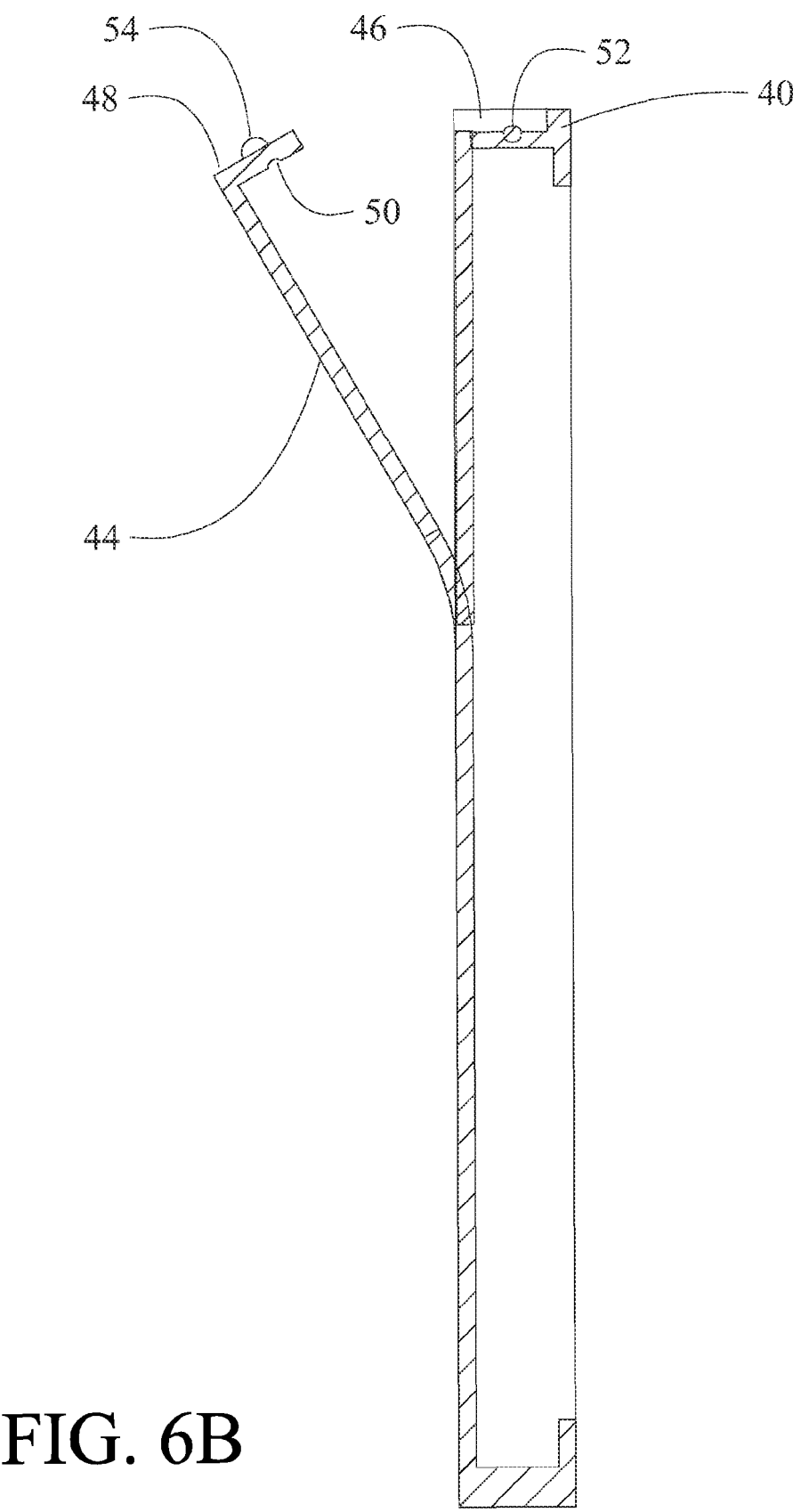
FIG. 6B is a side section view of the case of FIG. 6A.

FIGS. 5A and 5B show an embodiment with an alternative closure for the suspension flap in the case. Case 40 surrounds a cell phone 42 for the embodiment shown. A suspending flap 44 is molded to be received in a relief 46 in the case 40. As seen with the flap 44 disengaged from the relief 46 in FIGS. 6A and 6B, an angled head 48 provides the "hook" function for the flap to engage the vent slats as previously described. As best seen in FIG. 6B, a groove 50 on a bottom surface of the angled head is received over a protrusion 52 in the relief 46 on the case to secure the flap 44 in the closed position. In the example embodiment, an external protrusion 54 is provided on the upper surface of the head 48 to assist in gripping to disengage the groove 50 on flap from the protrusion 52. Materials for fabrication of the embodiment shown are thermoplastic vulcanizate (TPV) (a thermoplastic elastomer) or thermoplastic polyurethane (TPU) plastics for desired molding characteristics.

Figure 7:
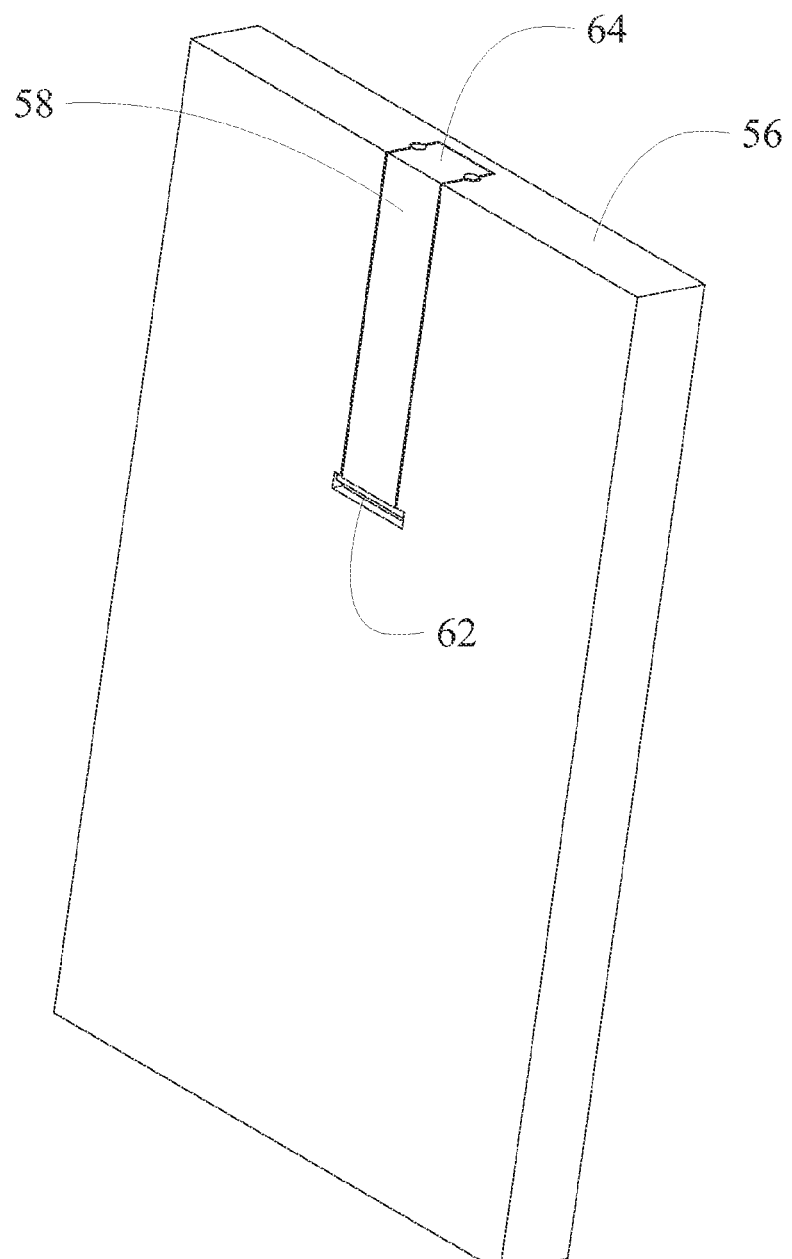
FIG. 7 is a rear pictorial view of a fourth embodiment of the case with a strip hinge for use in a rigid case.
Figure 8:
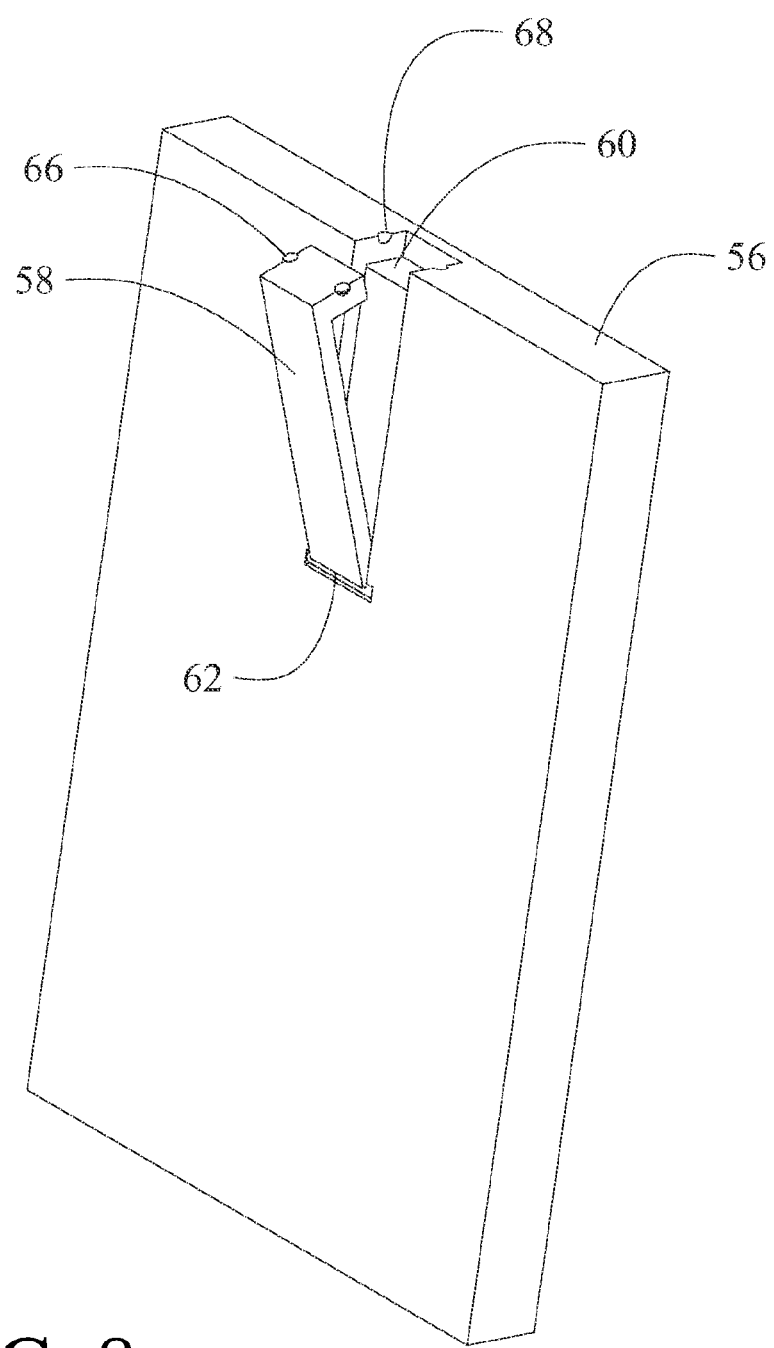
FIG. 8 is a rear pictorial view of the fourth embodiment with the flap extended.
Figure 9:
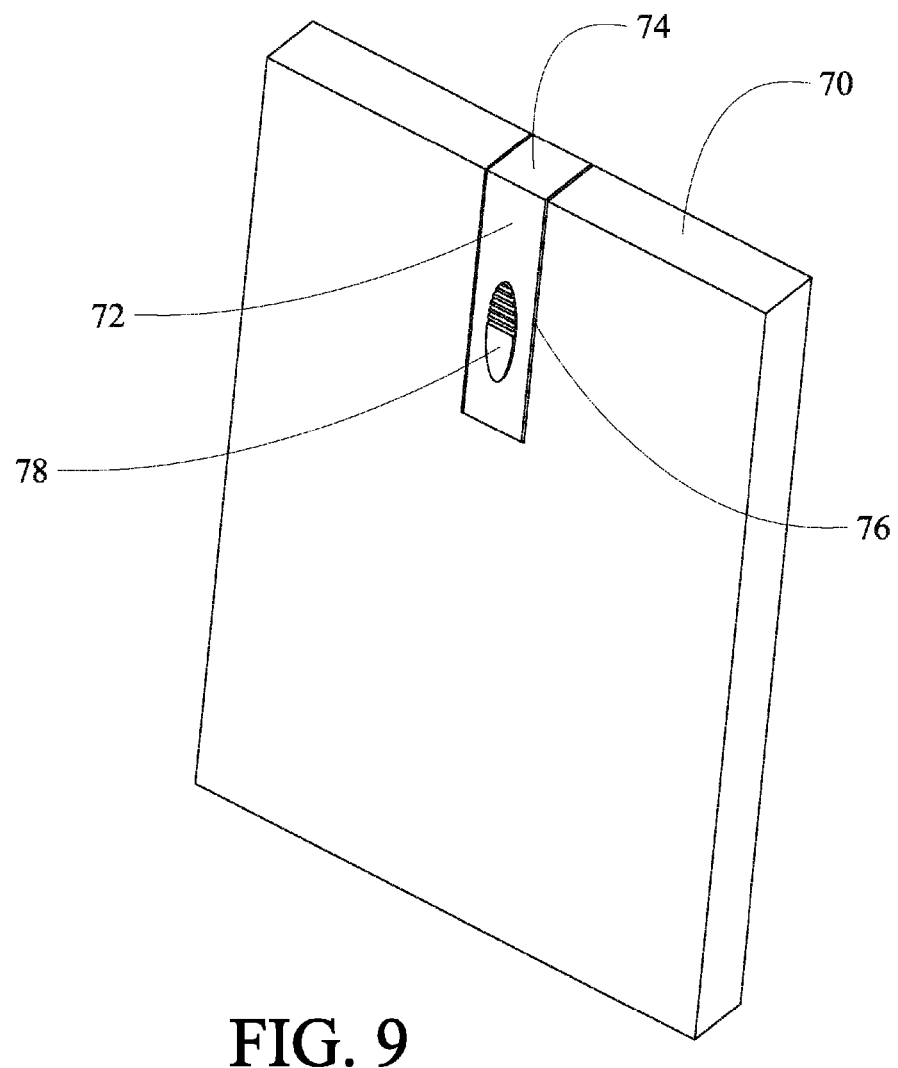
FIG. 9 is a rear pictorial view of a fifth embodiment for a rigid case with a combined slip and rotate hinge.

In certain applications, a hard case may be desired for additional protection of the phone or electronic device. An additional embodiment is shown in FIGS. 7 and 8 employing hard styrene plastic materials for a case 56 with a suspension flap 58 received within a relief 60 in the case 56. For the embodiment shown, the flap 58 is attached to the rear wall of the case 56 with a strip hinge 62 at the bottom edge of the flap which allows rotation of the flap outward form the case to be suspended from the vent slats as previously described with an angled head 64. The head and flap are retained in a closed position on the case by tits 66 received in dimples 68. While not shown a protrusion or thumb pad or similar feature may be employed on the angled head to facilitate disengagement of the head from the case.

Figure 10A:
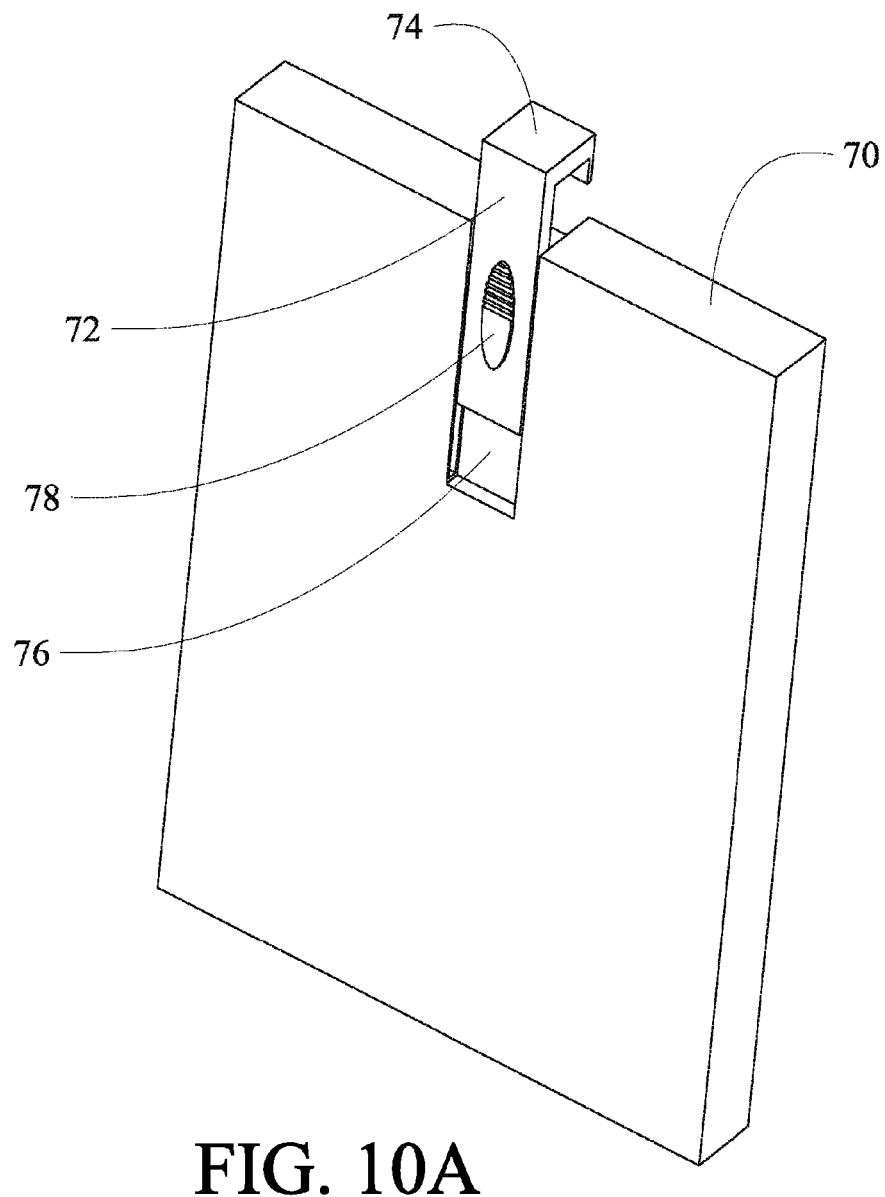
FIG. 10A is a rear pictorial view of the fifth embodiment showing the flap extended to release from the case.
Figure 10B:
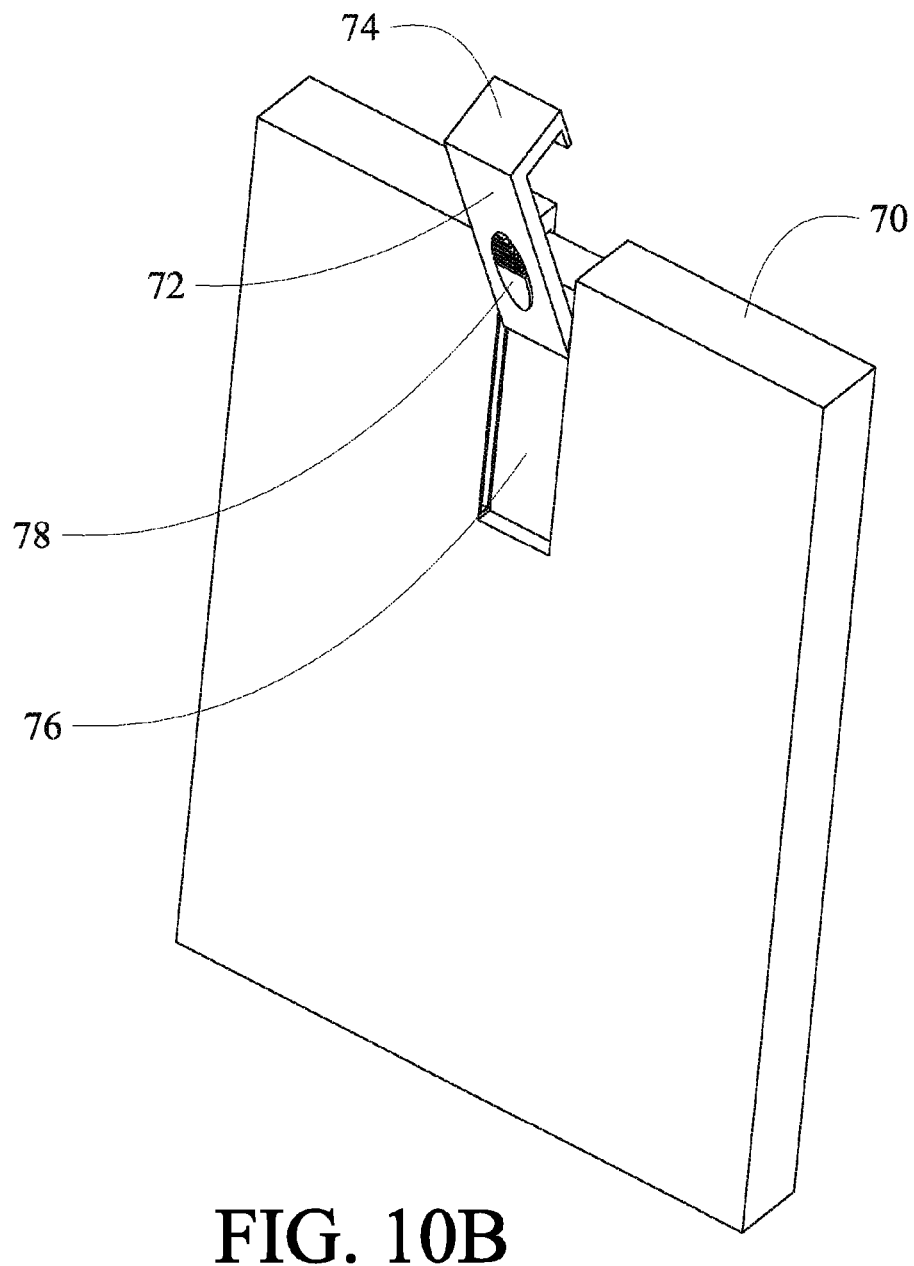
FIG. 10B is a rear pictorial view of the fifth embodiment with the flap rotated for engagement.
Figure 10C:
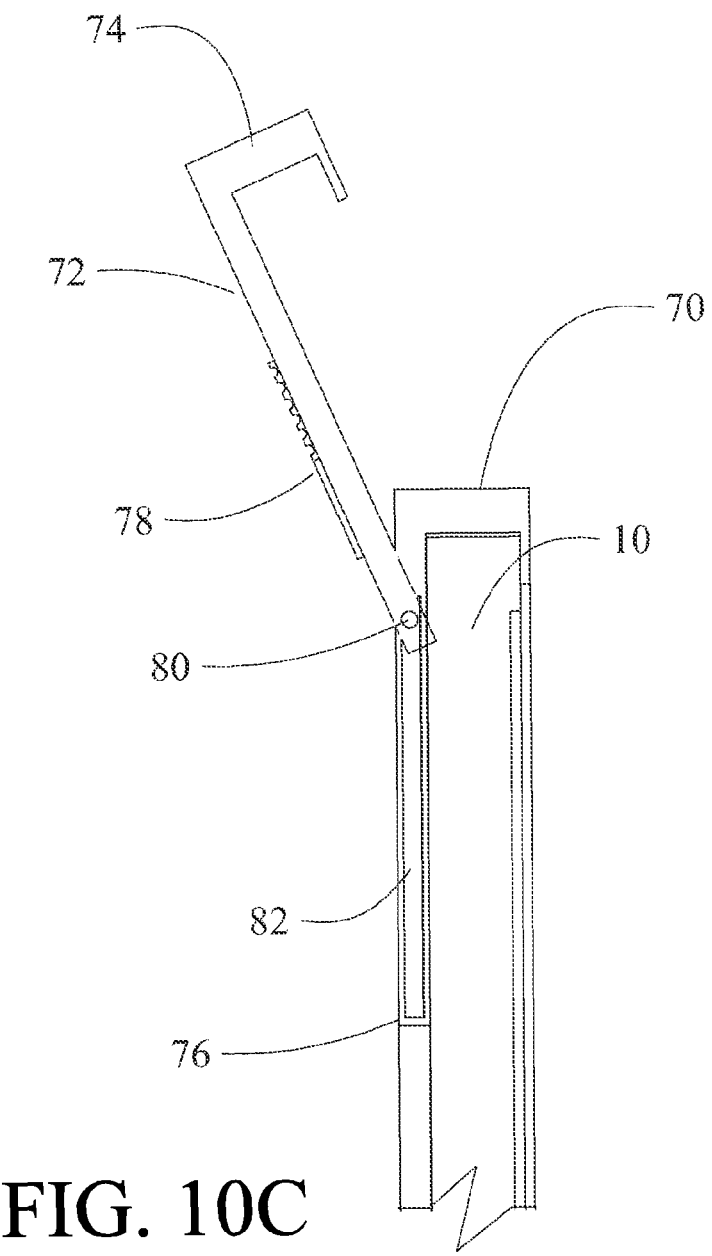
FIG. 10C is a side section view showing the details of the flap and hinge.

An alternative flap hinging approach for a hard case application is shown FIGS. 9 and 10A-C. Case 70 incorporates a suspension flap 72 with hook 74 extending over and engaging the top of the cell phone or personal electronic device in relief 76 in a closed position. As shown in FIG. 10A, release of the hook 74 from the case top is accomplished by sliding the suspension flap 72 upward. A textured thumb pad 78 or similar device may be employed to assist in urging the suspension flap 72 up. The suspension flap 72 may then be rotated outward as shown in FIG. 10B. Pins 80 best seen in FIG. 10C, extending from the sides proximate a lower edge of the suspension flap 72 slide and rotate in channels 82 in the side of the relief 76.

Figure 11:
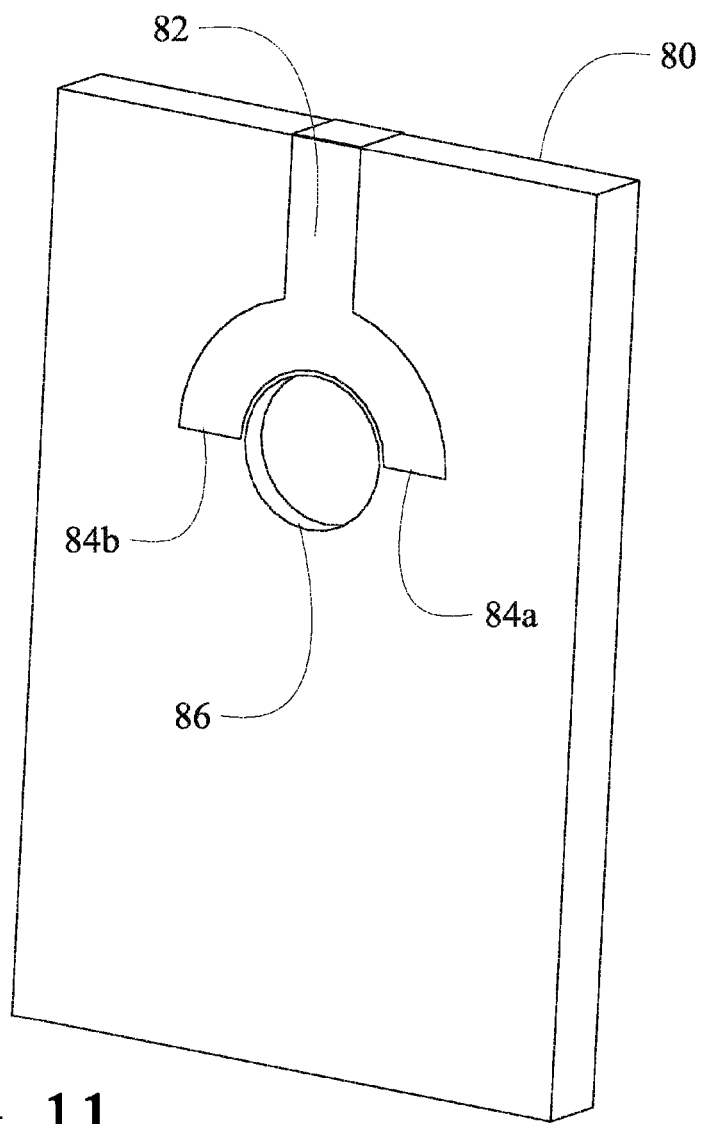
FIG. 11 is a rear pictorial views of a sixth stylized embodiment with the suspension flap in the closed position.

Various stylized forms for the hinge on the flap may be accommodated in either the resilient or hard case versions. FIG. 11 shows an exemplary case 80 having a hinge arrangement employing a flap 82 having dual living hinges 84a and 84b which are bifurcated in the flap to surround a substantially circular pad or window 86 on or through which a logo or similar identifying indicia may be placed or viewed.

Having now described various embodiments of the invention in detail as required by the patent statutes, those skilled in the art will recognize modifications and substitutions to the specific embodiments disclosed herein. Such modifications are within the scope and intent of the present invention as defined in the following

What is claimed is:

1. A self-hanging protective cover comprising:
   a case received over a personal electronic device and providing for viewing of a screen on the personal electronic device;
   at least one suspension flap having a first position engaging an upper edge of the personal electronic device substantially flush with the case and a second position released from the upper edge and rotated rearward, said flap being formed by a pair of slots extending through a top and back of the case with a living hinge and having an angled element to engage a vent slat.

2. The self-hanging protective cover as defined in claim 1 wherein the case is flexible material selected from the set of silicon rubber or elastomerics and said suspension flap is integral to the case.

3. The self-hanging protective cover as defined in claim 2 wherein said angled element is received over the upper edge of the personal electronic device, said angled element sufficiently resilient to be engaged and disengaged over the upper edge.

4. The self-hanging protective cover as defined in claim 1 wherein the at least one suspension flap comprises at least one suspension flap suspending the case in a landscape orientation and at least one second suspension flap suspending the case in a portrait orientation.

5. The self-hanging protective cover as defined in claim 1 wherein the at least one suspension flap is received in a relief in the case.

6. The self-hanging protective cover as defined in claim 5 wherein the angled head has an engagement groove and said relief includes a protrusion to engagement groove in a closed position.

7. The self-hanging protective cover as defined in claim 5 wherein the case is flexible material selected from the set of thermoplastic vulcanizate (TPV) (a thermoplastic elastomer) or thermoplastic polyurethane (TPU) plastics.

8. The self-hanging protective cover as defined in claim 1 wherein the case includes a front cutout exposing the screen of the personal electronic device.

9. A self-hanging protective cover comprising: a case received over a personal electronic device and providing for viewing of a screen on the personal electronic device; at least one suspension flap having a first position engaging an upper edge of the personal electronic device substantially flush with the case and a second position released from the upper edge and rotated rearwardly, said flap being formed by a pair of slots extending through a top and back of the case, being attached to the case with a strip hinge, and having an angled element to engage a vent slat.

10. The self-hanging protective cover as defined in claim 9 wherein the angled element comprises an angled head received in a relief in the case and further comprising tits extending from the angled head to be removably received in dimples in the relief in the case.

11. A self-hanging protective cover comprising: a case received over a personal electronic device and providing for viewing of a screen on the personal electronic device; at least one suspension flap having a first position engaging an upper edge of the personal electronic device substantially flush with the case and a second position released from the upper edge and rotated rearwardly, said flap having an angled element to engage a vent slat; wherein the suspension flap is received in a relief in the case, said relief incorporating side channels receiving pins extending from the flap, said flap extendible upwards along said channels and rotatable outward from said relief.

\* \* \* \* \*